United States Patent
Xiao et al.

(10) Patent No.: US 10,554,570 B2
(45) Date of Patent: Feb. 4, 2020

(54) METHOD AND DEVICE FOR IMPLEMENTING QOS IN OPENFLOW NETWORK

(71) Applicant: ZTE Corporation, Shenzhen (CN)

(72) Inventors: Min Xiao, Shenzhen (CN); Bo Wu, Shenzhen (CN); Junhui Zhang, Shenzen (CN)

(73) Assignee: XI'AN Zhongxing New Software Co., LTD., Shaanxi (CN)

( * ) Notice: Subject to any disclaimer, the term of this patent is extended or adjusted under 35 U.S.C. 154(b) by 560 days.

(21) Appl. No.: 14/909,199

(22) PCT Filed: Apr. 15, 2014

(86) PCT No.: PCT/CN2014/075382
§ 371 (c)(1),
(2) Date: Feb. 1, 2016

(87) PCT Pub. No.: WO2015/014133
PCT Pub. Date: Feb. 5, 2015

(65) Prior Publication Data
US 2016/0191406 A1 Jun. 30, 2016

(30) Foreign Application Priority Data
Jul. 31, 2013 (CN) .......................... 2013 1 0330279

(51) Int. Cl.
*H04L 12/863* (2013.01)
*H04L 12/721* (2013.01)
(Continued)

(52) U.S. Cl.
CPC ............ *H04L 47/622* (2013.01); *H04L 45/38* (2013.01); *H04L 45/745* (2013.01); *H04L 47/2441* (2013.01)

(58) Field of Classification Search
None
See application file for complete search history.

(56) References Cited

U.S. PATENT DOCUMENTS

| 5,850,399 A * | 12/1998 | Ganmukhi .......... H04L 12/5601 370/412 |
| 2012/0023498 A1* | 1/2012 | Sundararaman ...... H04L 47/621 718/102 |
| 2014/0226467 A1* | 8/2014 | Park .................... H04L 47/2491 370/229 |

FOREIGN PATENT DOCUMENTS

| CN | 101075971 A | 11/2007 |
| CN | 101478475 A | 7/2009 |

(Continued)

OTHER PUBLICATIONS

OpenFlow Switch Specification, Version 1.3.5, Mar. 26, 2015. Retrieved from "https://3vf60mmveq1g8vzn48q2o71a-wpengine.netdna-ssl.com/wp-content/uploads/2014/10/openflow-switch-v1.3.5.pdf".*

(Continued)

*Primary Examiner* — James P Duffy
(74) *Attorney, Agent, or Firm* — Cantor Colburn LLP (57) ABSTRACT

Provided are a method and device for implementing QoS in an OpenFlow network. The method includes that: for a packet entering an OpenFlow switch, when a flow table is successfully matched, an instruction which is used for calling a scheduler and adding the packet into a specified queue in the scheduler is executed; and under the triggering of the instruction, queue scheduling is managed by using the scheduler. By using the technical means provided by the disclosure, the technical problem in related art that the OpenFlow switch cannot implement Hierarchical QoS (HQoS) is solved, so that the OpenFlow switch may implement both single-layer QoS and HQoS.

12 Claims, 9 Drawing Sheets

(51) Int. Cl.
   *H04L 12/741*   (2013.01)
   *H04L 12/851*   (2013.01)

(56) References Cited

FOREIGN PATENT DOCUMENTS

| CN | 101667974 A | 3/2010 |
| --- | --- | --- |
| CN | 102185777 A | 9/2011 |
| CN | 102868645 A | 1/2013 |
| CN | 102957629 A | 3/2013 |

OTHER PUBLICATIONS

International Search Report for corresponding application No. PCT/CN2014/075382 filed on Apr. 15, 2014; dated Jul. 8, 2014.

Nam-Seok Ko, et al. "OPENQFLOW: Scalable OpenFlow with Flow-Based Qos", IEICE Transactions on Communications, Tokyo, JP. vol. E96B, XP001581639; No. 2, Feb. 1, 2013; pp. 10.

Nam-Seok, Ko; OpenQFlow: Scalable OpenFlow with Flow-based Qos, ETSI 3rd Future Networks Workshop, Apr. 10, 2013, XP055297334; [Retrieved from the Internet Aug. 24, 2016]URL:https://doxbox.etsi.org/workshop/2013/201304_fntworkshops/s05_sdn_ko.pdf; pp. 14.

Open Networking Foundation: "OpenFlow Switch Specification", Apr. 25, 2013, XP055277123, [Retrieved from the internet on Jun. 1, 2012]: URL:https://www.opennetworking.org/images/stories/downloads/sdn-resources/onf-specifications/openflow/openflow-spec-v1.3.2.pdf; pp. 124.

Supplementary European Search Report Application No. EP14832684; dated Aug. 25, 2016; pp. 8.

Tejas Networks: Tejas Networks Technology; Feb. 22, 2013; XP055135435, [Retrieved From the Internet on Aug. 20, 2014]URL:https://web.archive.org/web/20130222041553/http://www.tejasnetworks.com/technology_hqos.html pp. 1.

\* cited by examiner

| Match Fields | Priority | Counters | Instructions | Timeouts | Cookie |

Fig. 6

| Meter Identifier | Meter Bands | Counters |

Fig. 7

| for a packet entering an OpenFlow switch, when the flow table is successfully matched, an instruction which is used for calling a scheduler and adding the packet into a specified queue in the scheduler is executed | ⟵ S802 |
|---|---|
| under the triggering of the instruction, queue scheduling is managed by using the scheduler | ⟵ S804 |

| Scheduler ID | Queue ID | Next level scheduler ID | Meter ID | Congestion policy | Scheduling algorithm | Queue priority | Queue weight |

| Match Fields | Priority | Counters | Instructions | Timeouts | Cookie |
|---|---|---|---|---|---|
| VLAN = 10, CoS = 1 | | | Scheduler Queue 1 1 | | |
| VLAN = 10, CoS = 2 | | | Scheduler Queue 1 2 | | |

Fig. 16

| Meter Identifier | Meter Bands | Counters |
|---|---|---|
| 101 | CIR = 5M, PIR = 7M | |
| 201 | CIR = 1M, PIR = 2M | |

Fig. 17

| Scheduler ID | Queue ID | Next level scheduler ID | Meter ID | Congestion policy | Scheduling algorithm | Queue priority | Queue weight |
|---|---|---|---|---|---|---|---|
| 1 | 1 | 0 | 101 | WRED | WFQ | 1 | 80% |
| | 2 | 0 | 201 | WRED | WFQ | 2 | 20% |

Fig. 18

| Match Fields | Priority | Counters | Instructions | Timeouts | Cookie |
|---|---|---|---|---|---|
| VLAN = 10, CoS = 1 | | | Scheduler Queue 1 1 | | |
| VLAN = 10, CoS = 2 | | | Scheduler Queue 1 2 | | |
| VLAN = 20, CoS = 1 | | | Scheduler Queue 2 1 | | |
| VLAN = 20, CoS = 2 | | | Scheduler Queue 2 2 | | |

Fig. 19

| Meter Identifier | Meter Bands | Counters |
|---|---|---|
| 101 | CIR = 3M, PIR = 4M | |
| 201 | CIR = 2M, PIR = 3M | |
| 301 | CIR = 0.5M, PIR = 1M | |
| 401 | CIR = 0.5M, PIR = 1M | |
| 501 | CIR = 5M, PIR = 7M | |
| 601 | CIR = 1M, PIR = 2M | |

Fig. 20

| Scheduler ID | Queue ID | Next level scheduler ID | Meter ID | Congestion policy | Scheduling algorithm | Queue priority | Queue weight |
|---|---|---|---|---|---|---|---|
| 1 | 1 | 0 | 101 | WRED | WFQ | 1 | 55% |
| | 2 | 0 | 201 | WRED | WFQ | 2 | 45% |
| 2 | 1 | 0 | 301 | WRED | WFQ | 1 | 50% |
| | 2 | 0 | 401 | WRED | WFQ | 2 | 50% |
| 3 | 1 | 1 | 501 | WRED | WFQ | 1 | 65% |
| | 2 | 2 | 601 | WRED | WFQ | 2 | 35% |

Fig. 21

METHOD AND DEVICE FOR IMPLEMENTING QOS IN OPENFLOW NETWORK

TECHNICAL FIELD

The disclosure relates to the field of communications, and in particular to a method and device for implementing Quality of Service (QoS) in an OpenFlow network.

BACKGROUND

Figure 1:
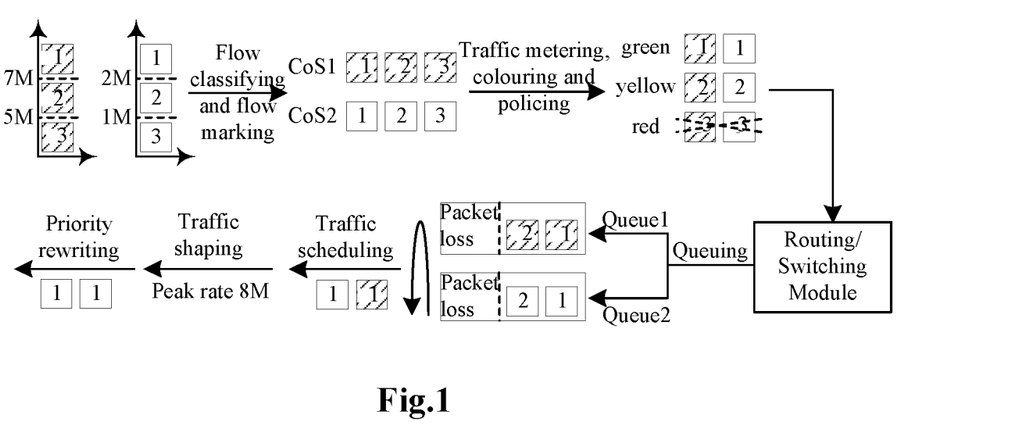
FIG. 1 is a diagram of a service traffic processing flow in which a network device implements the QoS function according to related art.

In the current data communication network, the QoS function is an important and commonly-used network function either in a Local Area Network (LAN), a metropolitan area network or a wide area network. The QoS function of a network means that the network provides different QoS guarantees aiming at different requirements of various service applications, such as bandwidth, packet loss rate, delay and delay jitter, so as to implement an integrated network which simultaneously carries various services like data, voice and video. FIG. 1 is a diagram of a service traffic processing flow in which a network device implements the QoS function; as shown in FIG. 1, the QoS function of the network mainly includes the following four functions: the first is a flow classifying and marking function; the flow is a group of data packets with the same characteristic; flow classifying is classifying service traffics entering the network according to a certain flow classifying rule (e.g. some field values based on a port or a packet); flow marking is setting a Class or Service (CoS) and a priority mark in the network for a service packet after flow classifying, so as to distinguish QoS of different service flows; the second is a traffic metering, colouring and policing function; this function is, after completing the flow classifying and the flow marking, performing rate metering to the service flow, and performing colouring and rate limiting to the packet entering according to an arrival rate of traffic, a configured Committed Information Rate (CIR) and a Peak Information Rate (PIR). Specifically speaking, packet colouring and rate limiting usually use a Two rate Three Colour Marker (TrTCM) algorithm which is specified by the standard RFC2698 of the Internet Engineering Task Force (IETF); the algorithm implements the rate limiting of the service flow by marking the packet not exceeding the CIR as green, marking the packet exceeding the CIR but not exceeding the PIR as yellow, marking the packet exceeding the PIR as red, and dropping the red packet; the third is a queue congestion managing and queue scheduling function; the service traffic after traffic metering, colouring and policing will enter buffer queues with different classes, and this process is called queuing; queue congestion managing is monitoring queue buffer, which is specifically foreseeing and avoiding the occurrence of congestion via Tail Drop (TD), Random Early Detection (RED) or Weighted Random Early Detection (WRED) and other packet dropping ways; queue scheduling is selecting the packets from the buffer queues representing different CoS and putting these packets in output queue in a particular order, namely scheduling aiming at a de-queuing order of the packets buffered in different queues, so as to avoid the congestion to the greatest extent and satisfy the de-queuing of the service traffic with high priority; the commonly used queue scheduling algorithms include a Strict Priority Queue (SPQ) scheduling algorithm, a Weighted Fair Queue (WFQ) scheduling algorithm, a Deficit Weighted Round Robin (DWRR) scheduling algorithm, and so on; the fourth is a traffic shaping and priority overriding function; traffic shaping is generally implemented to the traffic after queue scheduling through a leaky bucket mechanism; the traffic shaping implements a traffic rate limiting function as the traffic policing, and the difference between them is that the traffic shaping does not directly drop the traffics exceeding a limited rate as the traffic policing, but buffers these traffics, and sends out the buffered packets at the appropriate time, so that the traffic may maintain a quite uniform rate to contribute to reducing the probability of packet loss caused by the bursts of traffic at a downstream network node. Before the service traffic is sent out from an egress port, except the traffic shaping is completed, the priority of the packet may also be overridden to influence the QoS processing of the downstream network node.

Figure 2:
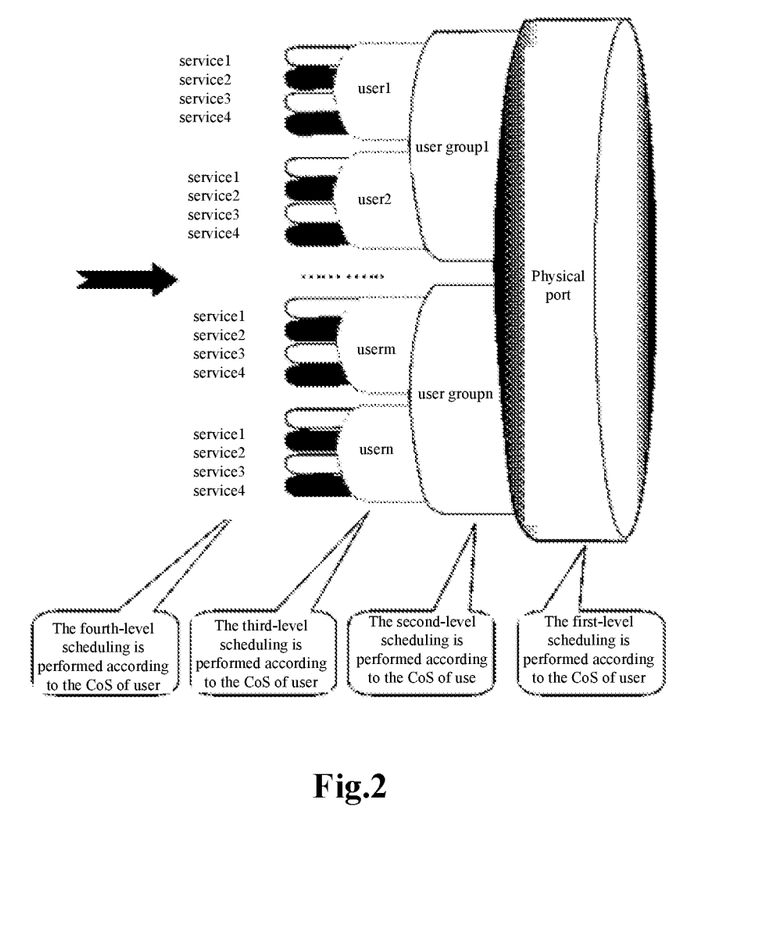
FIG. 2 is a diagram of a hierarchical traffic management model of the HQoS according to related art.
Figure 3:
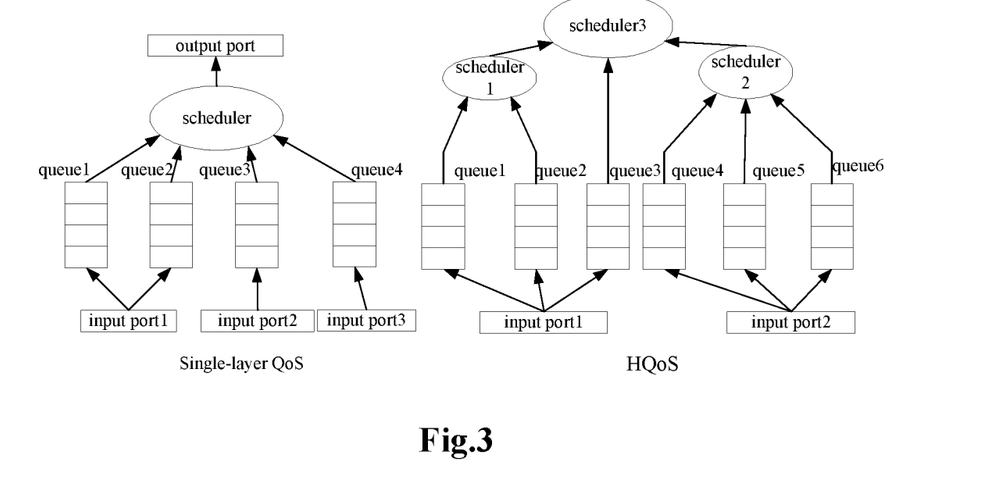
FIG. 3 is a comparison diagram of a single-layer QoS scheduling mechanism and an HQoS scheduling mechanism according to related art.

The QoS function of the network may be used for implementing both single-layer QoS and Hierarchical QoS (HQoS). The single-layer QoS may only perform service bandwidth control and queue scheduling based on the port, but cannot perform traffic management for different users and services with different CoS in the different users at the same time, while the HQoS may implement that. FIG. 2 is a diagram of a hierarchical traffic management model of the HQoS; as shown in FIG. 2, the HQoS in this example implements four-level traffic management, namely a port level, a user group level, a user level and a service level. The HQoS implements bandwidth control, queue scheduling and other QoS functions by layering, and may perform fine control to bandwidth allocation of each layer in a complicated networking and hierarchical service model, thereby achieving the purpose of guaranteeing the QoS of an end-to-end service. FIG. 3 is a comparison diagram of a single-layer QoS scheduling mechanism and an HQoS scheduling mechanism; as shown in FIG. 3, single-layer QoS scheduling means that the whole QoS processing uses only one scheduler and may complete only one layer of QoS scheduling; HQoS scheduling means that the whole QoS processing uses multiple schedulers (the HQoS in FIG. 3 uses three schedulers), and may complete multiple layers of QoS scheduling (the HQoS in FIG. 3 completes two layers of QoS scheduling). Based on the obvious technical advantages of the HQoS relative to the single-layer QoS, the TR-101 (the second edition) standard published by the international standards developing organization Broadband Forum (BBF) in July 2011 clearly puts forward that the network device is required to support the HQoS capability, and now there are more and more commercial network devices able to support the HQoS capability currently.

Figure 4:
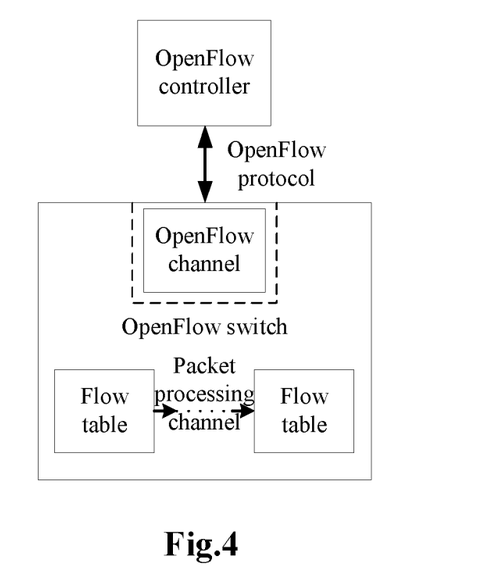
FIG. 4 is a diagram of an architecture of an OpenFlow network components according to related art.

With a Software Defined Network (SDN) concept presented and the development of applications of the concept, an OpenFlow technology as the core technology of the SDN is in a stage of rapid development; at present, an OpenFlow network built through the OpenFlow technology has been used more and more in the actual production and life. The OpenFlow network adopts an architecture with a control plane and a forwarding plane (also called a data plane) separate; FIG. 4 is a diagram of an architecture of the OpenFlow network components. As shown in FIG. 4, the control plane of the OpenFlow network is realized by an OpenFlow controller, wherein the OpenFlow controller is a device with strong computing capability, and the specific device type may be a personal computer, a server, or a server cluster and the like; the forwarding plane of the OpenFlow network is realized by an OpenFlow switch, the OpenFlow switch is a device with strong switching capability, and the specific device type may be a network device equipped with multiple network ports and performing packet processing and forwarding based on a flow table; an OpenFlow interface between the OpenFlow controller and the OpenFlow switch runs an OpenFlow protocol, wherein the protocol is developed and modified by the international standards developing organization Open Networking Foundation (ONF).

Figure 5:
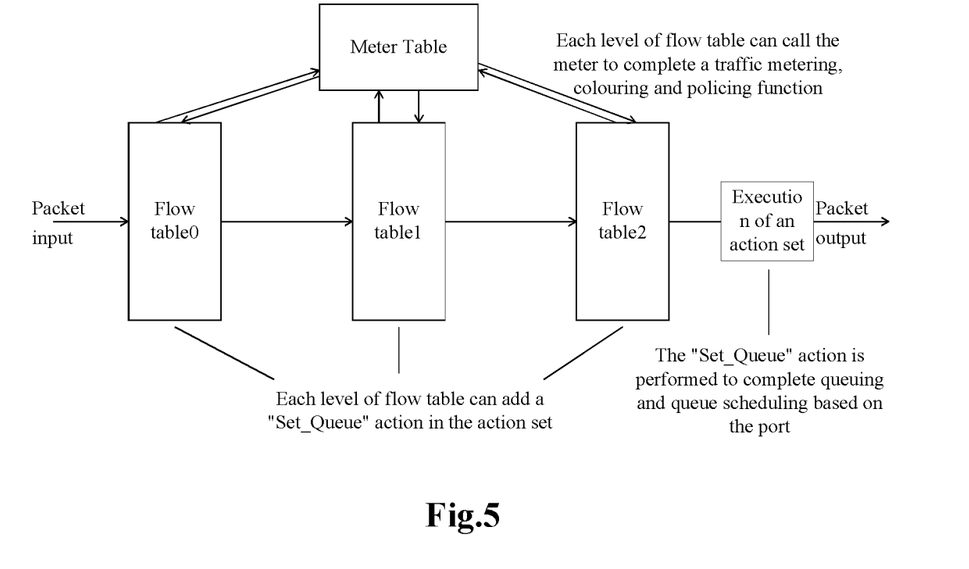
FIG. 5 is a diagram of a packet processing flow in which an OpenFlow switch implements the QoS function according to related art.
Figure 6:
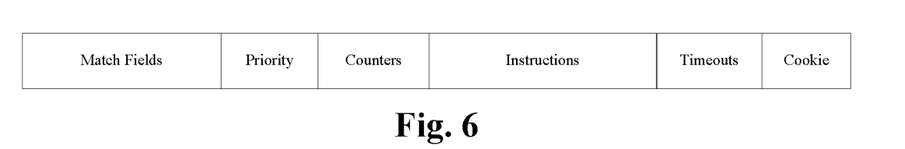
FIG. 6 is a format diagram of an OpenFlow flow table according to related art.
Figure 7:
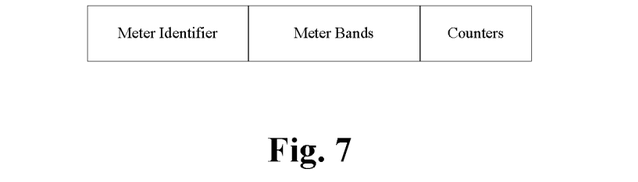
FIG. 7 is a format diagram of an OpenFlow meter table according to related art.

The OpenFlow switch specification 1.3.2 released by the ONF in April 2013 specifies an OpenFlow protocol flow and a packet processing flow in the OpenFlow switch, which include a method used by the OpenFlow protocol and the OpenFlow switch to implement the QoS function. FIG. 5 is a diagram of a packet processing flow in which the OpenFlow switch implements the QoS function; as shown in FIG. 5, first the flow table is matched for the packet entering the OpenFlow switch from an ingress port, wherein the flow table is issued, by the OpenFlow controller, to the OpenFlow switch through the OpenFlow protocol. FIG. 6 is a format diagram of the OpenFlow flow table; as shown in FIG. 6, the flow table may include multiple flow table entries, and all match fields in each flow table entry may be any fields (e.g. an address field, a user Identity (ID) field, a service priority field, and so on) in a packet header. Next, for the packet with the successfully matched flow table, an instruction in the corresponding flow table entry is executed. There is an instruction "Meter meter_id" available for calling the corresponding meter, wherein the meter may implement the traffic metering, colouring and policing function; all the meters are configured in a meter table, and the meter table is issued, by the OpenFlow controller, to the OpenFlow switch through the OpenFlow protocol. FIG. 7 is a format diagram of an OpenFlow meter table; as shown in FIG. 7, there may be multiple meters included in the meter table, and meter bands in each meter are used for configuring the CIR/PIR and a colouring rule of the meter. The packet processing flow of the OpenFlow switch may include multiple levels of flow table, an each level of flow table may call the meter; another instruction "Write-Actions action" may be used for adding new actions into an action set; there is an action "Set-Queue queue_id" available for adding the packet into the corresponding queue; each queue may implement the traffic metering, colouring and policing function, and multiple queues may also implement a queue scheduling function; configuration parameters of the queue are issued, by the OpenFlow controller, to the OpenFlow switch through an OF-Config protocol (which is a specified configuration protocol different from the OpenFlow protocol). As an action in the action set, a queuing and the queue scheduling function and other functions implemented by the Set-Queue action are executed at the end of the packet processing flow of the OpenFlow switch.

To sum up, as stipulated in the current OpenFlow switch specification, the traffic metering, colouring and policing function in the QoS function may be executed as the instruction during the packet processing flow of the OpenFlow switch, but the queuing and queue scheduling function may only be executed as the action at the end of the packet processing flow of the OpenFlow switch, which makes the OpenFlow switch be only able to implement single-layer queue scheduling based on the port instead of multi-layer queue scheduling required by the HQoS.

Aiming at the above problem that the OpenFlow switch cannot implement the HQoS, an effective solution has not been presented yet.

SUMMARY

Aiming at the technical problem in related art that the OpenFlow switch cannot implement the HQoS, embodiments of the disclosure provide a method and device for implementing QoS in the OpenFlow network, for at least solving the above problem.

According to an embodiment of the disclosure, a method for implementing QoS in the OpenFlow network is provided, which includes that: for a packet entering the OpenFlow switch, when the flow table is successfully matched, an instruction which is used for calling a scheduler and adding the packet into a specified queue in the scheduler is executed; and under the triggering of the instruction, queue scheduling is managed by using the scheduler.

Preferably, executing the instruction which is used for calling the scheduler and adding the packet into the specified queue in the scheduler includes that: the instruction, in a flow entry, matching the packet, of the flow table is executed.

Preferably, executing the instruction which is used for calling the scheduler and adding the packet into the specified queue in the scheduler includes that: according to a scheduler ID carried in the instruction, a specified scheduler corresponding to the scheduler ID in a scheduler table is called; and according to a queue ID carried in the instruction, the packet is added into the queue corresponding to the queue ID in the specified scheduler.

Preferably, the scheduler further includes: a next level scheduler ID, wherein the next level scheduler ID is used for a queue in the scheduler to call a next level scheduler.

According to another embodiment of the disclosure, a method for implementing QoS in the OpenFlow network is provided, which includes that: management information is added into a first message which is sent to the OpenFlow switch by the OpenFlow controller, wherein the management information is used for performing at least one of the following managements to a specified instruction: adding, modifying and deleting; and the specified instruction is used for calling the scheduler and adding the packet into the specified queue in the scheduler; and the first message is sent to the OpenFlow switch.

Preferably, the first message includes: a flow table configuring message.

Preferably, the above method further includes that: the OpenFlow controller sends at least one of the following messages to the OpenFlow switch: a configuring message and a reading message aiming at the scheduler table to which the scheduler belongs; wherein the configuring message is used for performing at least one of the following managements to the scheduler table and entries in the scheduler table: adding, modifying and deleting; the reading message is used for reading the scheduler table and the flow entries of the flow table.

Preferably, the above method further includes that: scheduler table error reporting information is added into a second message which is sent to the OpenFlow controller by the OpenFlow switch, wherein the scheduler table error reporting information is used for reporting the OpenFlow controller when an exception occurs in configuring the scheduler table according to the configuring message and when an exception occurs in reading the scheduler table according to the reading message.

According to another embodiment of the disclosure, a device for implementing QoS in the OpenFlow network is provided, which includes: an executing component, which is configured to, for the packet entering the OpenFlow switch, when the flow table is successfully matched, execute the instruction which is used for calling the scheduler and adding the packet into the specified queue in the scheduler;

and a managing component, which is configured to, under the triggering of the instruction, manage queue scheduling by using the scheduler.

Preferably, the executing component is configured to execute the instruction in the flow entry, matching with the packet, of the flow table.

Preferably, the executing component is further configured to execute the instruction when the scheduler includes the following content: the next level scheduler ID, wherein the next level scheduler ID is used for the queue in the scheduler to call the next level scheduler.

According to another embodiment of the disclosure, a device for implementing QoS in the OpenFlow network is provided, which includes: a first adding component, which is configured to add the management information into the first message which is sent to the OpenFlow switch by the OpenFlow controller, wherein the management information is used for performing at least one of the following managements to the specified instruction: adding, modifying and deleting; and the specified instruction is used for calling the scheduler and adding the packet into the specified queue in the scheduler; and a sending component, which is configured to send the first message to the OpenFlow switch.

Preferably, the above device further includes: a second adding component, which is configured to add the scheduler table error reporting information into the second message which is sent to the OpenFlow controller by the OpenFlow switch, wherein the scheduler table error reporting information is used for reporting an exception to the OpenFlow controller when the exception occurs in configuring the scheduler table according to the configuring message and when the exception occurs in reading the scheduler table according to the reading message.

By using the technical means provided by the embodiments of the disclosure, namely executing, for the packet with the successfully matched flow table, the instruction which is used for calling the scheduler and adding the packet into the specified queue in the scheduler, the technical problem in related art that the OpenFlow switch cannot implement the HQoS is solved, so that the OpenFlow switch may implement both the single-layer QoS and the HQoS.

BRIEF DESCRIPTION OF THE DRAWINGS

The accompanying drawings described here are used for providing a deeper understanding of the disclosure, and constitute a part of the application; schematic embodiments of the disclosure and description thereof are used for illustrating the disclosure and not intended to form an improper limit to the disclosure. In the accompanying drawings.

DETAILED DESCRIPTION OF THE EMBODIMENTS

The disclosure is elaborated below with reference to the accompanying drawings and embodiments. Note that, embodiments and features in embodiments in the application may be combined with each other on condition of not conflicting.

Embodiment 1

Figure 8:
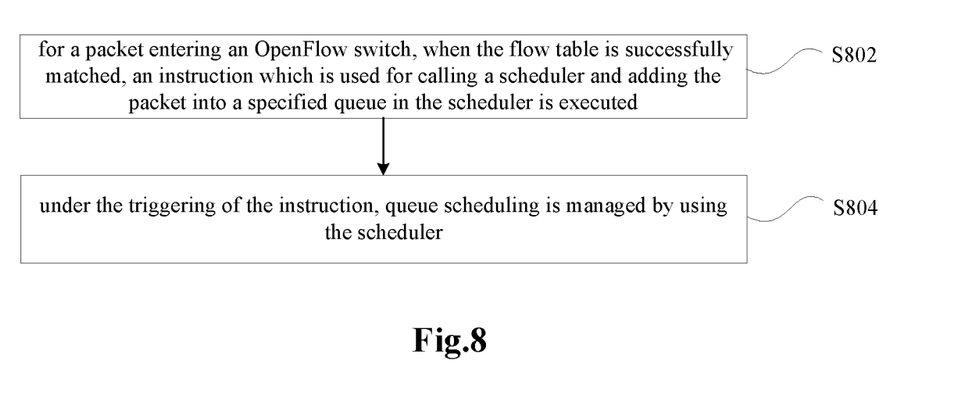
FIG. 8 is a flowchart of a method for implementing QoS in an OpenFlow network according to the embodiment 1 of the disclosure.

First of all, an illustration is given from the OpenFlow switch. FIG. 8 is a flowchart of a method for implementing QoS in an OpenFlow network according to an embodiment 1 of the disclosure. As shown in FIG. 8, the method includes the following blocks.

In block S802: for a packet entering an OpenFlow switch, when the flow table is successfully matched, an instruction which is used for calling a scheduler and adding the packet into a specified queue in the scheduler is executed.

In the related art, when the flow table is successfully matched, although the corresponding instruction may be executed, the function of the instruction executed now is calling the corresponding meter to implement the traffic metering, colouring and policing function, rather than executing the instruction which is used for calling the scheduler and adding the packet into the specified queue in the scheduler, and the queuing and queue scheduling function (namely the function of calling the scheduler and adding the packet into the specified queue of the scheduler) is executed at the end of the packet processing flow of the OpenFlow switch, so the HQoS cannot be implemented. However, in block S802, when the flow table is successfully matched, the queuing and queue scheduling function is directly performed, so the HQoS may be implemented.

In block S804: under the triggering of the instruction, queue scheduling is managed by using the scheduler. In this block, the scheduler may implement the queue congestion managing and queue scheduling function; besides, the scheduler may also call the meter for the queue in the scheduler to complete the traffic metering, colouring and policing function.

In the present embodiment, the instructions may be carried in the flow table entry which is sent by the OpenFlow controller to the OpenFlow switch; at this point, S802 may take, but is not limited to, the following form: executing the instruction, in the flow table entry, matching with the packet.

In the present embodiment, when the scheduler is called, the scheduler may be called in the scheduler table according to the scheduler ID; at this point, S802 may take, but is not limited to, the following form: according to the scheduler ID carried in the instruction, calling the specified scheduler, in the scheduler table, corresponding to the scheduler ID; similarly, according to the queue ID carried in the instruction, the packet may also be added into the queue corresponding to the queue ID in the specified scheduler.

There are a variety of ways of implementing the HQoS based on S802 to S804, for example, it is feasible to nest another scheduler in the scheduler; at this point, the scheduler in S802 to S804 further includes: an ID of the next level scheduler, wherein the ID of the next level scheduler is used for the queue in the scheduler to call the next level scheduler.

Figure 9:
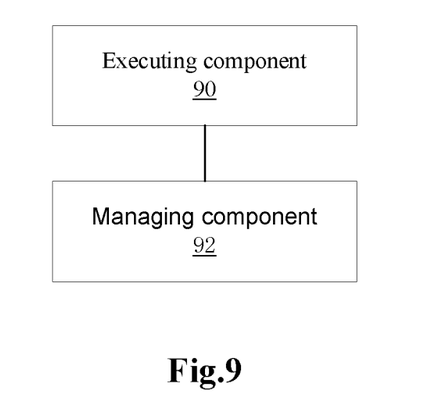
FIG. 9 is a structural diagram of a device for implementing QoS in an OpenFlow network according to the embodiment 1 of the disclosure.

The present embodiment also provides a device for implementing QoS in the OpenFlow network for implementing the above embodiments and preferred implementations, and these embodiments and preferred implementations which have been illustrated will not be repeated; the components involved in the device are elaborated below. The term "component" used below is a combination of software and/or hardware which may implement intended functions. Although the device described in the following embodiments is realized by software preferably, realization through hardware or the combination of software and hardware is also possible and conceived. FIG. 9 is a structural diagram of a device for implementing QoS in an OpenFlow network according to an embodiment 1 of the disclosure. As shown in FIG. 9, the device includes:

the executing component 90, which is connected to the managing component 92, and is configured to, for the packet entering the OpenFlow switch, when the flow table is successfully matched, execute the instruction which is used for calling the scheduler and adding the packet into the specified queue in the scheduler; and the managing component 92, which is configured to, under the triggering of the instruction, manage queue scheduling by using the scheduler.

The functions implemented by the above components may also implement the HQoS.

In a preferred implementation of the present embodiment, the executing component 90 is configured to execute the instruction in the flow table entry matching with the packet.

Preferably, the executing component 90 is further configured to execute the instruction when the scheduler includes the following content: an ID of a next level scheduler, wherein the ID of the next level scheduler is used for the queue in the scheduler to call the next level scheduler.

In the present embodiment, for implementing the HQoS, the OpenFlow controller is also improved, which is elaborated below.

Figure 10:
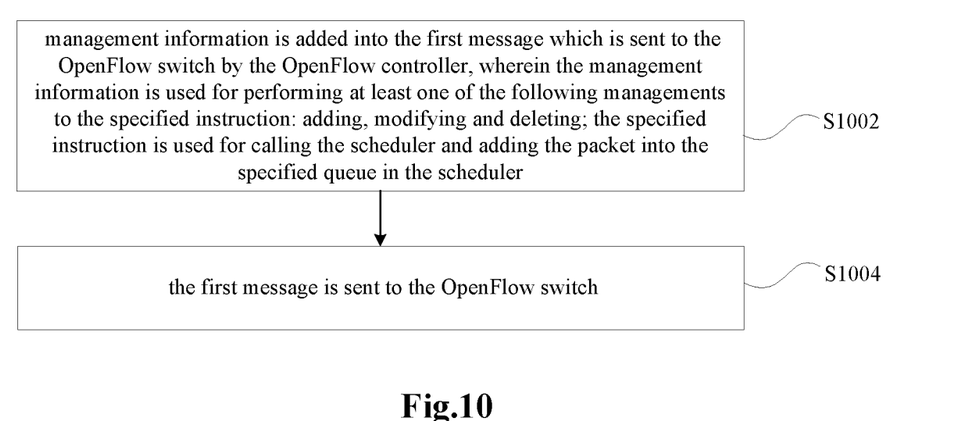
FIG. 10 is another flowchart of a method for implementing QoS in an OpenFlow network according to the embodiment 1 of the disclosure.

FIG. 10 is another flowchart of a method for implementing QoS in an OpenFlow network according to the embodiment 1 of the disclosure. As shown in FIG. 10, the method includes the following blocks.

In block S1002: management information is added into the first message which is sent to the OpenFlow switch by the OpenFlow controller, wherein the management information is used for performing at least one of the following managements to the specified instruction: adding, modifying and deleting; the specified instruction is used for calling the scheduler and adding the packet into the specified queue in the scheduler; the first message includes, but is not limited to: the flow table configuring message.

For further supporting the above processing flow, the message which is sent to the OpenFlow switch by the OpenFlow controller includes at least one of the following messages: the configuring message and the reading message aiming at the scheduler table to which the scheduler belongs; wherein the configuring message is used for performing at least one of the following managements to the scheduler table and the entries in the scheduler table: adding, modifying and deleting; the reading message is used for reading the scheduler table and the entries of the scheduler table; that is, the OpenFlow controller needs to send at least one of the above messages to the OpenFlow switch.

In block S1004: the first message is sent to the OpenFlow switch.

For enabling the OpenFlow controller to be informed of a supporting state, which indicates whether the OpenFlow switch supports the scheduler or not, in time, the scheduler table error reporting information is added into the second message which is sent to the OpenFlow controller by the OpenFlow switch, wherein the scheduler table error reporting information is used for reporting the exception to the OpenFlow controller when the exception occurs in configuring the scheduler table according to the configuring message or when the exception occurs in reading the scheduler table according to the reading message. The second message includes, but is not limited to: an error reporting message; that is, the scheduler table error reporting information may be added into the existing error reporting message.

Figure 11:
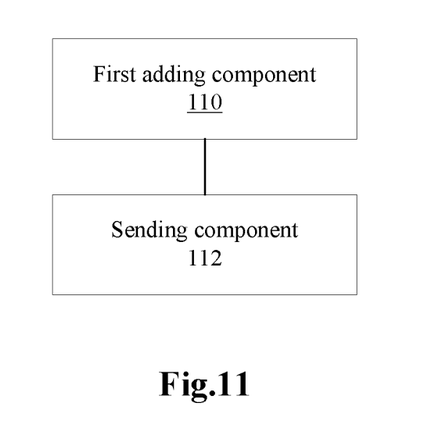
FIG. 11 is another structural diagram of a device for implementing QoS in an OpenFlow network according to the embodiment 1 of the disclosure.

The present embodiment also provides a device for implementing QoS in an OpenFlow network; as shown in FIG. 11, the device includes:

the first adding component 110, which is connected to the sending component 112, and is configured to add the management information into the first message which is sent to the OpenFlow switch by the OpenFlow controller, wherein the management information is used for performing at least one of the following managements to the specified instruction: adding, modifying and deleting; the specified instruction is used for calling the scheduler and adding the packet into the specified queue in the scheduler; and the sending component 112, which is configured to send the first message to the OpenFlow switch.

Figure 12:
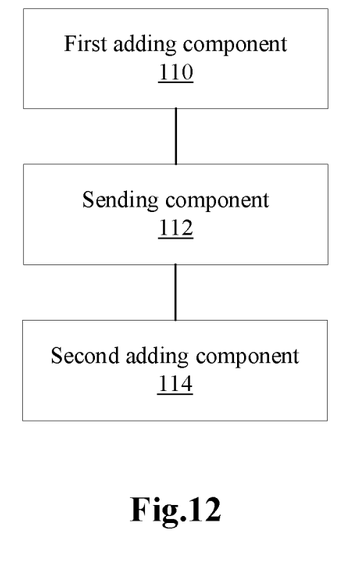
FIG. 12 is a structural diagram of a device shown in FIG. 11 according to a preferred embodiment of the disclosure.

In a preferred embodiment, as shown in FIG. 12, the device may further include, but is not limited to, the following components: the second adding component 114, which is configured to add the scheduler table error reporting information into the second message which is sent to the OpenFlow controller by the OpenFlow switch, wherein the scheduler table error reporting information is used for reporting the exception to the OpenFlow controller when the exception occurs in configuring the scheduler table according to the configuring message or when the exception occurs in reading the scheduler table according to the reading message. Note that, the component may be applied to the OpenFlow switch.

Note that, the terms "the first" and "the second" in the present embodiment are only used for distinguishing different characteristics, instead of forming limits to the present embodiment (e.g. an executing order).

For understanding the embodiment 1 better, an elaboration is given below in combination with preferred embodiments 2-4 of the embodiment 1.

Embodiment 2

Figure 13:
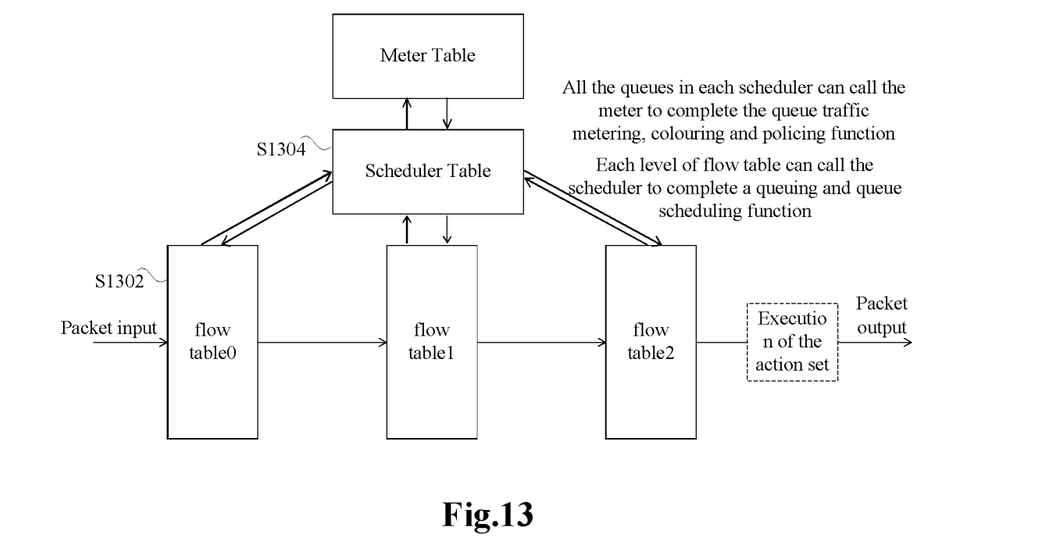
FIG. 13 is a schematic diagram of packet processing that an OpenFlow switch provided by the embodiment 2 of the disclosure implements the QoS function.

The present embodiment provides a method for implementing QoS in an OpenFlow network, which is applied to the OpenFlow switch; as shown in FIG. 13, the OpenFlow switch mainly implements, but is not limited to, the follows:

In block S1302: first the packet entering the OpenFlow switch from the ingress port is compared with the entries in the flow table; if the packet matches an entry in the flow table, a Scheduler Queue instruction (Scheduler Queue scheduler_id queue_id) in the corresponding flow table entry is executed; the instruction uses the scheduler ID (Scheduler_ID) and the queue ID (Queue_ID) as parameters, and is used for calling the corresponding scheduler and making the packet enter the corresponding queue in the scheduler.

Each scheduler includes one or more queues, and all the schedulers are configured in the scheduler table. The packet processing flow of the OpenFlow switch may include multiple levels of flow tables, and each level of flow table may call the scheduler.

S1304: after the packet matches the flow table, the corresponding scheduler is called and the packet enters the corresponding queue of the scheduler, the scheduler may implement the queue congestion managing and queue scheduling function; besides, the scheduler may also call the meter for the queues in it, and the meter may implement the traffic metering, colouring and policing function of the queue.

For implementing the HQoS, a certain scheduler in the scheduler table may call another scheduler for the queue in it; and multi-layer nested calling of the scheduler is allowed. That is, the scheduler called by an upper-layer scheduler may also call the next level scheduler, so as to form a multi-layer queue scheduling structure.

Figure 14:
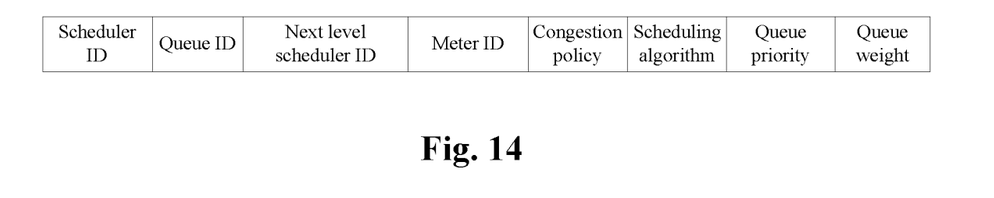
FIG. 14 is a format diagram of an OpenFlow scheduler table provided by the embodiment 2 of the disclosure.

FIG. 14 is a format diagram of the OpenFlow scheduler table; as shown in FIG. 14, there may be multiple schedulers included in the scheduler table, and each scheduler includes two fields "Scheduler ID" and "Queue ID", and the two fields are the IDs which are used by a flow table instruction to call the scheduler, and are used for ensuring the packet to enter the correct queue of the correct scheduler; each scheduler also includes a field "Next Level Scheduler ID", and the field is used for the queue in the scheduler to call the corresponding next level scheduler; when a value of the field "Next Level Scheduler ID" is 0, it means that any other scheduler is not called; each scheduler also includes a field "Meter ID", and the field is used for the queue in the scheduler to call the corresponding meter; when a value of the field "Meter ID" is 0, it means that any meter is not called; each scheduler also includes the parameters like "Congestion Policy", "Scheduling Algorithm", "Queue Priority" and "Queue Weight" which are usually used by queue congestion management and queue scheduling.

Figure 15:
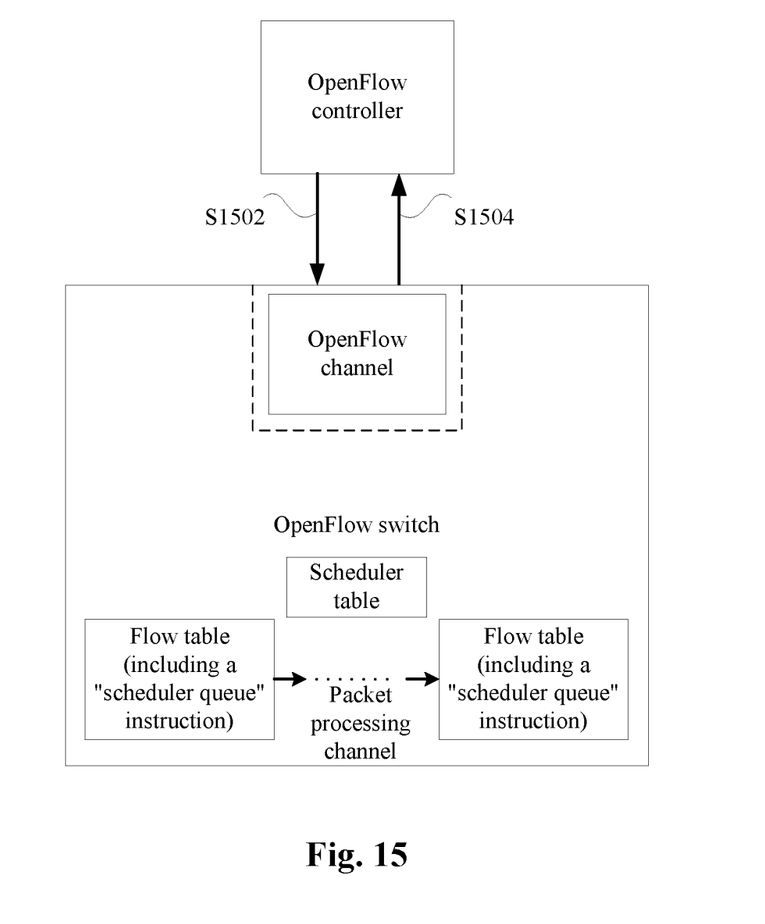
FIG. 15 is a schematic diagram of implementing QoS in an OpenFlow network according to the embodiment 2 of the disclosure.

The present embodiment also provides a method for implementing QoS in the OpenFlow network, which is applied to the OpenFlow controller and the OpenFlow switch; as shown in FIG. 15, the method includes the following blocks.

In block S1502: a protocol message of the existing OpenFlow protocol is extended; a support for using the "Scheduler Queue" instruction in the flow table is added into the flow table configuring message of the "Controller-to-Switch" type which is sent to the OpenFlow switch by the OpenFlow controller, thereby implementing adding, modifying and deleting of the "Scheduler Queue" instruction in the flow table.

The existing OpenFlow protocol is extended, and a scheduler table configuring message and a scheduler table reading message are added into the message of the "Controller-to-Switch" type which is sent to the OpenFlow switch by the OpenFlow controller, wherein the scheduler table configuring message implements adding, modifying and deleting of the scheduler table and its entries, and the scheduler table reading message implements reading of the scheduler table and its entries.

In block S1504: the protocol message of the existing OpenFlow protocol is extended; scheduler table configuration error information and scheduler table reading error information are added into the error reporting message of the "Asynchronous" type which is sent to the OpenFlow controller by the OpenFlow switch, wherein the scheduler table configuration error information is used for reporting an error when it is failed to configure the scheduler table and its entries on the switch, and the scheduler table reading error information is used for reporting an error when it is failed to read the scheduler table and its entries on the switch.

Embodiment 3

In the present embodiment, the user A assigned to a Virtual LAN (VLAN) 10 (VLAN_ID=10) has the service traffics with two Class of Service (CoS) (which are respectively CoS=1 and CoS=2) passing through the OpenFlow network, and it is needed to complete the single-layer QoS on the OpenFlow switch for the service traffics.

In combination with FIG. 13 and FIG. 15, in the present embodiment, the OpenFlow controller and the OpenFlow switch in the OpenFlow network need to perform the following blocks.

In block 1: the OpenFlow protocol runs between the OpenFlow controller and the OpenFlow switch, and the OpenFlow controller issues the flow table, the meter table and the scheduler table to the OpenFlow switch.

Figure 16:
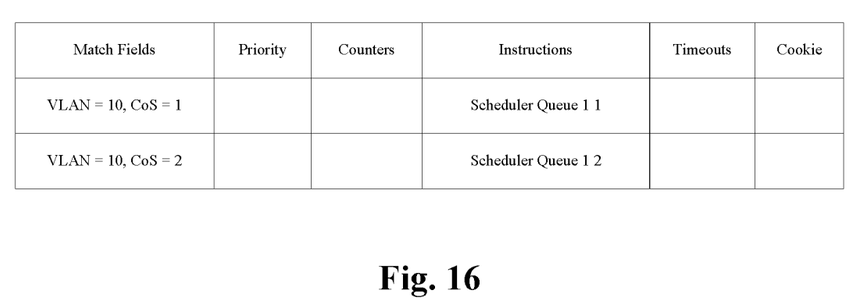
FIG. 16 is a diagram of flow table contents in an OpenFlow switch according to the embodiment 3 of the disclosure.
Figure 17:
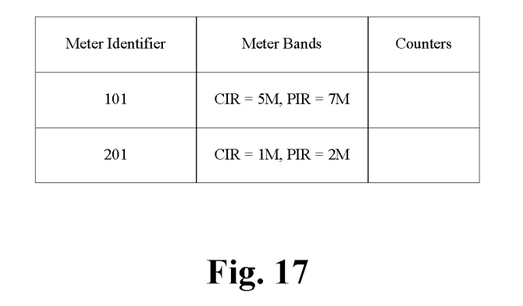
FIG. 17 is a diagram of meter table contents in an OpenFlow switch according to the embodiment 3 of the disclosure.
Figure 18:
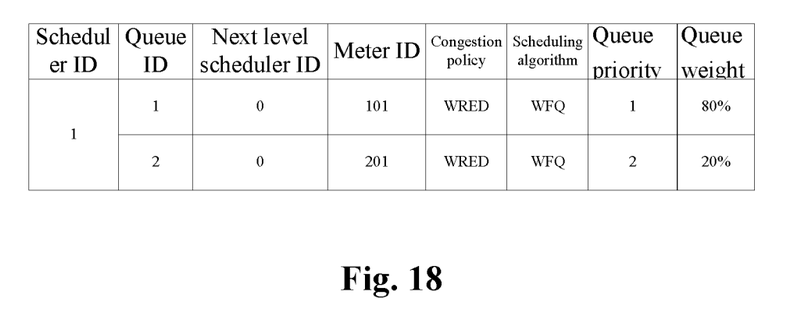
FIG. 18 is a diagram of scheduler table contents in an OpenFlow switch according to the embodiment 3 of the disclosure.

FIG. 16 is a diagram of flow table contents in the OpenFlow switch; as shown in FIG. 16, there is only the first level of flow table in the OpenFlow switch; the flow table includes two flow table entries, and all instruction fields in each flow table entry include the "Scheduler Queue" instruction. FIG. 17 is a diagram of meter table contents in the OpenFlow switch; as shown in FIG. 17, the meter table includes two meters whose IDs are respectively 101 and 201. FIG. 18 is a diagram of scheduler table contents in the OpenFlow switch; as shown in FIG. 18, the scheduler table includes a scheduler whose ID is 1; such a scheduler includes two queues whose IDs are respectively 1 and 2.

If it is failed to configure the flow table, the meter table and the scheduler table, which are issued to the OpenFlow switch by the OpenFlow controller, on the OpenFlow switch, the OpenFlow switch sends the corresponding error report message indicating the failed configuration to the OpenFlow controller.

In block 2: first entries of the flow table is compared with the packet entering the OpenFlow switch from the ingress port, for the packet matched successfully (VLAN=10, CoS=1), the "Scheduler Queue" instruction (Scheduler Queue 1 1) is executed, and the instruction calls the scheduler 1 and makes the packet enter the queue 1 in the scheduler 1; for the packet matched successfully (VLAN=10, CoS=2), the "Scheduler Queue" instruction (Scheduler Queue 1 2) is executed, and the instruction calls the scheduler 1 and makes the packet enter the queue 2 in the scheduler 1.

In block 3: the meter 101 is called to meter, colour and police the service traffic entering the queue 1 in the scheduler 1; the meter 201 is called to meter, colour and police the service traffic entering the queue 2 in the scheduler 1; then, according to the scheduling algorithm WFQ, the service traffics of the queue 1 and the queue 2 in the scheduler 1 are performed the queue scheduling based on the weights 80% and 20%; when the congestions occur in the queue 1 and the queue 2, the congestion policy WRED is adopted; the next level scheduler ID of the queue 1 is 0, it means that the queue 1 does not call the next level scheduler, likewise, the queue 2 also does not call the next level scheduler.

Embodiment 4

In the present embodiment, the user A assigned to the VLAN 10 (VLAN ID=10) has the service traffics with two CoS (which are respectively CoS=1 and CoS=2) passing through the OpenFlow network, and the user B assigned to the VLAN 20 (VLAN_ID=20) also has the service traffics of two CoS (which are respectively CoS=1 and CoS=2) passing through the OpenFlow network; it is needed to complete the HQoS on the OpenFlow switch to implement two-level scheduling among the service traffics of different CoS of each user and among the service traffics of different users.

In combination with FIG. 13 and FIG. 15, in the present embodiment, the OpenFlow controller and the OpenFlow switch in the OpenFlow network need to perform the following blocks.

In block 1: the OpenFlow protocol runs between the OpenFlow controller and the OpenFlow switch, and the OpenFlow controller issues the flow table, the meter table and the scheduler table to the OpenFlow switch.

Figure 19:
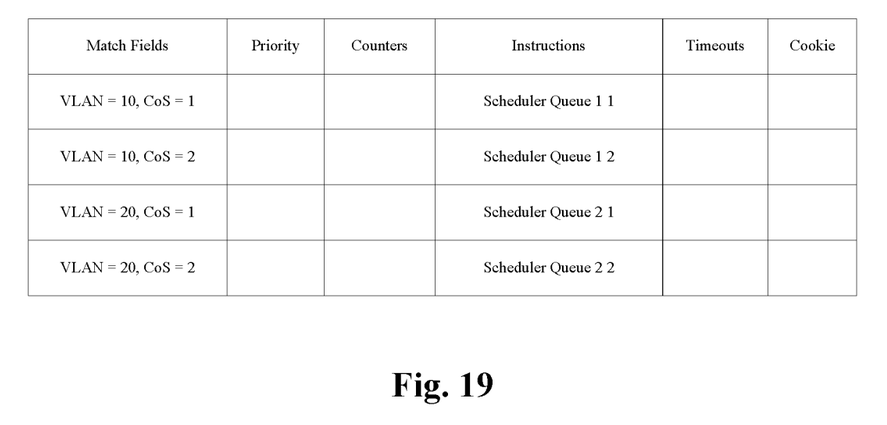
FIG. 19 is a diagram of flow table contents in an OpenFlow switch according to the embodiment 4 of the disclosure.
Figure 20:
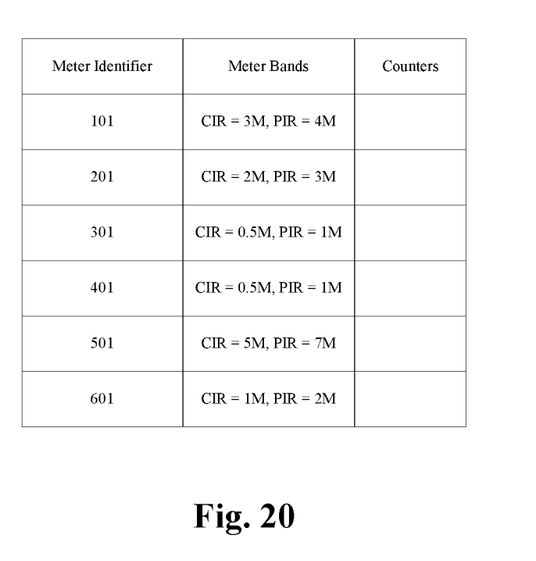
FIG. 20 is a diagram of meter table contents in an OpenFlow switch according to the embodiment 4 of the disclosure.
Figure 21:
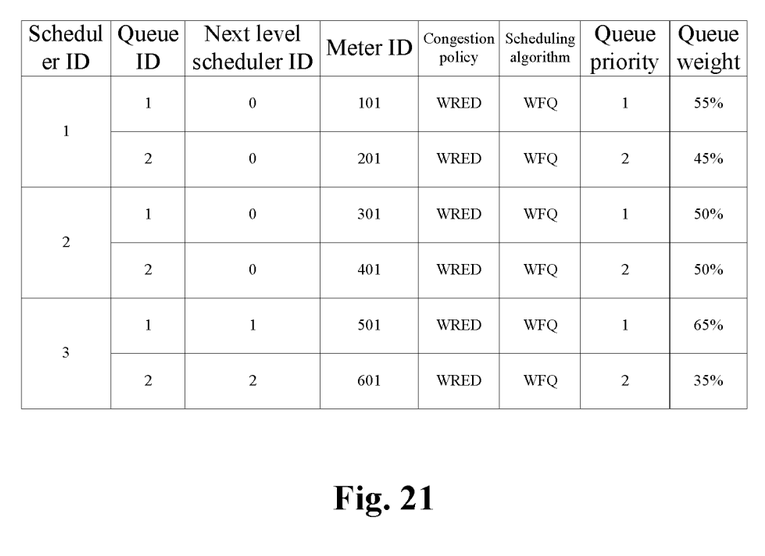
FIG. 21 is a diagram of scheduler table contents in an OpenFlow switch according to the embodiment 4 of the disclosure.

FIG. 19 is a diagram of flow table contents in the OpenFlow switch; as shown in FIG. 19, there is only the first level of flow table in the OpenFlow switch; the flow table includes four flow table entries, and all instruction fields in each flow table entry include the "Scheduler Queue" instruction. FIG. 20 is a diagram of meter table contents in the OpenFlow switch; as shown in FIG. 20, the meter table includes six meters whose IDs are respectively 101, 201, 301, 401, 501 and 601. FIG. 21 is a diagram of scheduler table contents in the OpenFlow switch; as shown in FIG. 21, the scheduler table includes three schedulers whose IDs are respectively 1, 2 and 3, wherein the scheduler 1 includes two queues whose IDs are respectively 1 and 2, the scheduler 2 also includes two queues whose IDs are respectively 1 and 2, and the scheduler 3 also includes two queues whose IDs are respectively 1 and 2. The next level scheduler ID of the queue 1 in the scheduler 3 is 1, which means that the queue 1 calls the scheduler 1; the next level scheduler ID of the queue 2 in the scheduler 3 is 2, which means that the queue 2 calls the scheduler 2. So, both the scheduler 1 and the scheduler 2 are the next level schedulers of the scheduler 3.

If it is failed to configure the flow table, the meter table and the scheduler table, which are issued to the OpenFlow switch by the OpenFlow controller, on the OpenFlow switch, the OpenFlow switch sends the corresponding error report message indicating the failed configuration to the OpenFlow controller.

In block 2: first the entries of the flow table are respectively compared with the packet entering the OpenFlow switch from the ingress port, for the packet matched successfully (VLAN=10, CoS=1), the "Scheduler Queue" instruction (Scheduler Queue 1 1) is executed, and the instruction calls the scheduler 1 and makes the packet enter the queue 1 in the scheduler 1; for the packet matched successfully (VLAN=10, CoS=2), the "Scheduler Queue" instruction (Scheduler Queue 1 2) is executed, and the instruction calls the scheduler 1 and makes the packet enter the queue 2 in the scheduler 1; for the packet matched successfully (VLAN=20, CoS=1), the "Scheduler Queue" instruction (Scheduler Queue 2 1) is executed, and the instruction calls the scheduler 2 and makes the packet enter the queue 1 in the scheduler 2; for the packet matched successfully (VLAN=20, CoS=2), the "Scheduler Queue" instruction (Scheduler Queue 2 2) is executed, and the instruction calls the scheduler 2 and makes the packet enter the queue 2 in the scheduler 2.

In block 3: the meter 101 is called to meter, colour and police the service traffic entering the queue 1 in the scheduler 1; the meter 201 is called to meter, colour and police the service traffic entering the queue 2 in the scheduler 1; then, according to the scheduling algorithm WFQ, the traffics of the queue 1 and the queue 2 in the scheduler 1 are performed the queue scheduling based on the weights 55% and 45%; when the congestions occur in the queue 1 and the queue 2, the congestion policy WRED is adopted; the next level scheduler ID of the queue 1 is 0, it means that the queue 1 does not call the next level scheduler, likewise, the queue 2 also does not call the next level scheduler.

The meter 301 is called to meter, colour and police the service traffic entering the queue 1 in the scheduler 2; the meter 401 is called to meter, colour and police the service traffic entering the queue 2 in the scheduler 2; then, according to the scheduling algorithm WFQ, the traffics of the queue 1 and the queue 2 in the scheduler 2 complete the queue scheduling based on the weights 50% and 50%; when the congestions occur in the queue 1 and the queue 2, the congestion policy WRED is adopted; the next level scheduler ID of the queue 1 is 0, it means that the queue 1 does not call the next level scheduler, likewise, the queue 2 also does not call the next level scheduler.

As mentioned above, both the scheduler 1 and the scheduler 2 are the next level schedulers of the scheduler 3. Output service traffic after the scheduler 1 completes the queue scheduling enters the queue 1 of the scheduler 3, and the service traffic entering the queue 1 of the scheduler 3 is metered, coloured and policed by calling the meter 501; the output service traffic after the scheduler 2 completes the queue scheduling enters the queue 2 of the scheduler 3, and the service traffic entering the queue 2 of the scheduler 3 is metered, coloured and policed by calling the meter 601. Then, according to the scheduling algorithm WFQ, the traffics of the queue 1 and the queue 2 in the scheduler 3 complete the queue scheduling based on the weights 65% and 35%; when the congestions occur in the queue 1 and the queue 2, the congestion policy WRED is adopted.

In another embodiment, software is also provided; the software is used for implementing the technical solutions described in the above embodiments and preferred implementations.

In another embodiment, a storage medium is also provided; the software is stored in the storage medium; the storage medium includes, but is not limited to: an optical disk, a floppy disk, a hard disk, an erasable memory, and so on.

To sum up, the embodiments of the disclosure achieve the following beneficial effects: the embodiments extend an implementing mechanism of the QoS function which is specified by the OpenFlow switch specification set by the ONF, add a new method and step for queuing the packet and scheduling the queue into the packet processing flow, and extend the existing OpenFlow protocol to support the new method for queuing the packet and scheduling the queue, thereby overcoming the defect of the traditional art that the HQoS cannot be implemented, and realizing an OpenFlow switch processing mechanism unifying the single-layer QoS with the HQoS.

Obviously, those skilled in the art should appreciate that the above components and blocks of the disclosure may be implemented by a general-purpose computing device, and they may be centralized in a single computing device or distributed on a network composed of multiple computing devices; optionally, they may be implemented by a program code which is capable of being executed by the computing device, so that they may be stored in a storage device and executed by the computing device; in addition, under some conditions, the presented or described blocks may be executed in an order different from that described here; or they are made into integrated circuit components, respectively; or multiple components and blocks of them are made into a single integrated circuit component to realize. In this way, the disclosure is not limited to any particular combination of hardware and software.

The above is only the preferred embodiment of the disclosure and not intended to limit the disclosure; for those skilled in the art, the disclosure may have various modifications and changes. Any modifications, equivalent replacements, improvements and the like within the spirit and principle of the disclosure shall fall within the scope of the claims of the disclosure.

INDUSTRIAL APPLICABILITY

The technical solutions provided by the disclosure may be applied to the process of implementing QoS in the OpenFlow network; by using the technical means, namely executing, for the packet with the successfully matched flow table, the instruction which is used for calling the scheduler and adding the packet into the specified queue in the scheduler, the technical problem in related art that the OpenFlow switch cannot implement the HQoS is solved, so that the OpenFlow switch may implement both the single-layer QoS and the HQoS.

What is claimed is:

1. A method for implementing Quality of Service (QoS) in an OpenFlow network, comprising:
    for a packet entering an OpenFlow switch, when a flow table is successfully matched, executing an instruction which is used for calling a scheduler and adding the packet into a specified queue in the scheduler; and
    under the triggering of the instruction, managing queue scheduling by using the scheduler;
    wherein the scheduler further comprises: a next level scheduler ID, wherein the next level scheduler ID is used for a queue in the scheduler to call a next level scheduler.

2. The method according to claim 1, wherein executing the instruction which is used for calling the scheduler and adding the packet into the specified queue in the scheduler comprises:
    executing the instruction in a flow entry, matching the packet, of the flow table.

3. The method according to claim 1, wherein executing the instruction which is used for calling the scheduler and adding the packet into the specified queue in the scheduler comprises:
    according to a scheduler Identity (ID) carried in the instruction, calling the specified scheduler, in a scheduler table, corresponding to the scheduler ID; and
    according to a queue ID carried in the instruction, adding the packet into a queue, in the specified scheduler, corresponding to the queue ID.

4. A method for implementing Quality of Service (QoS) in an OpenFlow network, comprising:
    adding management information into a first message which is sent to an OpenFlow switch by an OpenFlow controller, wherein the management information is used for performing at least one of the following managements to a specified instruction: adding, modifying and deleting, and the specified instruction is used for calling a scheduler and adding a packet into a specified queue in the scheduler; and
    sending the first message to the OpenFlow switch;
    wherein the scheduler further comprises: a next level scheduler ID, wherein the next level scheduler ID is used for a queue in the scheduler to call a next level scheduler.

5. The method according to claim 4, wherein the first message comprises: a flow table configuring message.

6. The method according to claim 4, further comprising:
    sending, by the OpenFlow controller, at least one of the following messages to the OpenFlow switch: a configuring message and a reading message aiming at the scheduler table to which the scheduler belongs; wherein the configuring message is used for performing at least one of the following managements to the scheduler table and entries in the scheduler table: adding, modifying and deleting; the reading message is used for reading the scheduler table and the entries in the scheduler table.

7. The method according to claim 6, further comprising:
    adding scheduler table error reporting information into a second message which is sent to the OpenFlow controller by the OpenFlow switch, wherein the scheduler table error reporting information is used for reporting an exception to the OpenFlow controller when the exception occurs in configuring the scheduler table according to the configuring message or when the exception occurs in reading the scheduler table according to the reading message.

8. The method according to claim 7, wherein the second message comprises: an error reporting message.

9. A device for implementing Quality of Service (QoS) in an OpenFlow network, comprising:
    an executing component configured to, for a packet entering an OpenFlow switch, when a flow table is successfully matched, execute an instruction which is used for calling a scheduler and adding the packet into a specified queue in the scheduler; and a managing component configured to, under the triggering of the instruction, manage queue scheduling by using the scheduler;

wherein the executing component is further configured to execute the instruction when the scheduler comprises the following content: a next level scheduler Identity (ID), wherein the next level scheduler ID is used for the queue in the scheduler to call a next level scheduler.

10. The device according to claim 9, wherein the executing component is configured to execute the instruction, in a flow entry, matching the packet, of the flow table.

11. A device for implementing Quality of Service (QoS) in an OpenFlow network, comprising:

a first adding component configured to add management information into a first message which is sent to an OpenFlow switch by an OpenFlow controller, wherein the management information is used for performing at least one of the following managements to a specified instruction: adding, modifying and deleting; and the specified instruction is used for calling a scheduler and adding a packet into a specified queue in the scheduler; and a sending component, configured to send the first message to the OpenFlow switch;

wherein the scheduler further comprises: a next level scheduler ID, wherein the next level scheduler ID is used for a queue in the scheduler to call a next level scheduler.

12. The device according to claim 11, further comprising:

a second adding component configured to add scheduler table error reporting information into a second message which is sent to the OpenFlow controller by the OpenFlow switch, wherein the scheduler table error reporting information is used for reporting an exception to the OpenFlow controller when the exception occurs in configuring the scheduler table according to the configuring message or when the exception occurs in reading the scheduler table according to the reading message.

* * * * *